United States Patent
Rajendran Venkateswara et al.

(10) Patent No.: US 11,861,875 B2
(45) Date of Patent: Jan. 2, 2024

(54) SYSTEM AND METHOD FOR ADAPTIVE IMAGE TRANSFORMATION

(71) Applicant: Tata Consultancy Services Limited, Mumbai (IN)

(72) Inventors: Balaji Rajendran Venkateswara, Chennai (IN); Ganesh Prasath Ramani, Chennai (IN); Guruswaminathan Adimurthy, Chennai (IN); Aashish Chandra, Gurgaon (IN)

(73) Assignee: Tata Consultancy Limited Services, Mumbai (IN)

( * ) Notice: Subject to any disclaimer, the term of this patent is extended or adjusted under 35 U.S.C. 154(b) by 311 days.

(21) Appl. No.: 17/404,846

(22) Filed: Aug. 17, 2021

(65) Prior Publication Data

US 2022/0284230 A1    Sep. 8, 2022

(30) Foreign Application Priority Data

Jan. 29, 2021 (IN) ............................ 202121003943

(51) Int. Cl.
*G06V 10/25* (2022.01)
*G06N 3/04* (2023.01)
(Continued)

(52) U.S. Cl.
CPC .............. *G06V 10/25* (2022.01); *G06F 18/23* (2023.01); *G06N 3/04* (2013.01); *G06T 3/0012* (2013.01);
(Continued)

(58) Field of Classification Search
CPC .... G06V 10/25; G06V 10/462; G06V 10/761; G06V 10/454; G06F 18/23; G06N 3/04;
(Continued)

(56) References Cited

U.S. PATENT DOCUMENTS

2012/0269441 A1*  10/2012  Marchesotti .......... G06F 18/253
                                                          382/195
2015/0178786 A1*   6/2015  Claessens .......... G06Q 30/0277
                                                          705/14.66
(Continued)

OTHER PUBLICATIONS

Ahmadi, Mahdi et al., "Context aware saliency map generation using semantic segmentation", Computer Vision and Pattern Recognition, Jan. 2018, Arxiv, https://arxiv.org/ftp/arxiv/papers/1801/1801.00266.pdf.

(Continued)

*Primary Examiner* — Aaron W Carter
(74) *Attorney, Agent, or Firm* — Finnegan, Henderson, Farabow, Garrett & Dunner, L.L.P.

(57) ABSTRACT

Image transformation tasks such as cropping, text addition etc. are common across industries. Each industry has different business context and demands the image transformations be performed aligned to the business context. This disclosure relates to a system and method for an adaptive image transformation for a given context and maintaining aesthetic sense of the transformed image. Herein, the system is configurable and adaptive to any business context or domain. The system learns the context from available domain samples and creates an automated workflow of context-aware transformation tasks that maintains both the content and aesthetics demands of the context. Further, a saliency map is extracted for the identified RoI to append a text to the RoI based on the extracted saliency map, the calculated similarity metric for various content and aesthetic factors and various preferences of the user.

10 Claims, 8 Drawing Sheets

(51) Int. Cl.
  *G06V 10/46* (2022.01)
  *G06F 18/23* (2023.01)
  *G06T 3/00* (2006.01)
  *G06V 10/74* (2022.01)
(52) U.S. Cl.
  CPC .......... *G06T 3/0056* (2013.01); *G06V 10/462* (2022.01); *G06V 10/761* (2022.01)
(58) Field of Classification Search
  CPC ........ G06N 3/045; G06N 3/08; G06T 3/0012; G06T 3/0056
  See application file for complete search history.

(56) References Cited

U.S. PATENT DOCUMENTS

| | | | |
|---|---|---|---|
| 2016/0350336 A1* | 12/2016 | Checka | ................ G06V 10/454 |
| 2019/0132520 A1 | 10/2019 | Gupta et al. | |
| 2020/0193206 A1* | 6/2020 | Turkelson | ............. G06F 18/214 |
| 2021/0004589 A1* | 1/2021 | Turkelson | .............. G06V 10/82 |
| 2021/0027508 A1* | 1/2021 | Sharma | ................ G06V 30/414 |
| 2021/0342972 A1* | 11/2021 | Mironica | .............. G06T 3/4038 |
| 2022/0284230 A1* | 9/2022 | Rajendran Venkateswara | ............ G06F 18/23 |

OTHER PUBLICATIONS

Rajbhoj, Asha et al., "A System for Semi-automatic Construction of Image Processing Pipeline for Complex Problems", Enterprise, Business-Process and Information Systems Modeling, Jan. 2019, Springer, https://www.researchgate.net/publication/333239574_A_System_for_Semmi-automatic_Construction_of_Image_Processing_Pipeline_for_Complex_Problems/link/5d1c44cc92851cf440602f4c/download.

* cited by examiner

FIG. 8

SYSTEM AND METHOD FOR ADAPTIVE IMAGE TRANSFORMATION

CROSS-REFERENCE TO RELATED APPLICATIONS AND PRIORITY

This U.S. patent application claims priority under 35 U.S.C. § 119 to India Application No. 202121003943, filed on Jan. 29, 2021. The entire content of the abovementioned application is incorporated herein by reference.

TECHNICAL FIELD

The disclosure herein generally relates to the field of image transformation, and more specifically to, a system and method for an adaptive image transformation for a given context and maintaining aesthetic sense of the transformed image.

BACKGROUND

Image transformation tasks such as cropping, text addition etc. are common across industries. Each industry has different business context and demands the image transformations be performed aligned to the business context. And so, mostly image transformations are done with point solutions that are designed or trained to perform transformations for a particular domain or context. These point solutions are not easily adaptive to new or changing business contexts and leveraging the solution for new domain requires rigorous training or design level changes. Furthermore, these systems need manual intervention when multiple transformations to be performed for the context.

In the existing state of the art, there are various challenges in image transformation task such as maintaining both content and aesthetic sense in performing transformations, frequently changing contextual requirements, extending solution to new contexts/domains for new clients/markets, high volume of images to be processed, consistent output across a context/domain and a quicker time-to-market.

Apparently, the image transformation tasks are either performed manually by person skilled in the domain or with point solutions designed for the context. The problems with above-said approaches are time consuming and resource intensive. Human intervention is needed in choosing right transformations to be applied based on the context. Results are not consistent, as its subjective to humans. Inflexibility of point solutions for varying contextual needs. Workflow is not configurable to changing contextual needs, hence human intervention needed These problems lead to increased processing time of images and hence time to market is delayed.

SUMMARY

Embodiments of the disclosure present technological improvements as solutions to one or more of the above-mentioned technical problems recognized by the inventors in conventional systems. For example, in one embodiment, a system and method for an adaptive image transformation for a given context and maintaining aesthetic sense of the transformed image is provided.

In one aspect, the processor-implemented method comprising receiving, via an input/output interface, at least one image to perform one or more context-adaptive image transformations, and one or more preference of a user to specify one or more content factors and one or more aesthetic factors of a transformed image, and training a content learning network based on a predefined set of sample images to extract one or more content factors from the received at least one image, an aesthetics learning network based on the predefined set of sample images to extract aesthetic factors from the received at least one image and a translation network based on the extracted content factors and aesthetic factors of the predefined set of sample images. At least one region of interest (RoI) is identified from the received at least one image based on the received one or more preferences of the user and one or more content factors and one or more aesthetic factors are extracted from the at least one identified RoI using the trained content learning network and aesthetics learning network. Further, the method derives at least one context from the extracted one or more content factors and one or more aesthetic factors using the trained translation network. Furthermore, the method comprising identifying context-aware workflow from the derived at least one context and the received one or more user preferences and calculating a similarity metric for the extracted at least one content and aesthetic factor to determine at least one context requirement. One or more context-adaptive image transformations are performed based on the identified context-aware workflow to get a transformed image, wherein the transformed image preserving the one or more content factors and aesthetics required for the context.

In another aspect, a system for an adaptive image transformation for a given context and maintaining aesthetic sense of the transformed image is provided. The system includes an input/output interface configured to receive at least one image to perform one or more context-adaptive image transformations, and one or more preference of a user to specify one or more content factors and one or more aesthetic factors of a transformed image, at least one memory storing a plurality of instructions and one or more hardware processors communicatively coupled with the at least one memory, wherein the one or more hardware processors are configured to execute the plurality of instructions stored in the at least one memory.

Further, the system is configured to train a content learning network based on a predefined set of sample images to extract one or more content factors from the received at least one image, an aesthetics learning network based on the predefined set of sample images to extract aesthetic factors from the received at least one image and a translation network based on the extracted content factors and aesthetic factors of the predefined set of sample images to derive context factors. Further, the system is configured to identify at least one region of interest (RoI) from the received at least one image based on the received one or more preferences of the user, extract one or more content factors and one or more aesthetic factors from the at least one identified RoI using the trained content learning network and aesthetics learning network, and derive at least one context from the extracted one or more content factors and one or more aesthetic factors using a pre-trained translation network. Furthermore, the system is configured to identify context-aware workflow from the derived at least one context and the received one or more user preferences, calculate a similarity metric for the extracted at least one content and aesthetic factor to determine at least one context requirement and perform one or more context-adaptive image transformations based on the identified context-aware workflow to get a transformed image, wherein the transformed image preserving the one or more content factors and aesthetics required for the context.

In yet another aspect, a non-transitory computer readable medium storing one or more instructions which when executed by one or more processors on a system cause the one or more processors to perform the method is provided. The non-transitory computer readable medium for an adaptive image transformation for a given context and maintaining aesthetic sense of the transformed image is provided. The method includes one or more steps such as receiving, via an input/output interface, at least one image to perform one or more context-adaptive image transformations, and one or more preference of a user to specify one or more content factors and one or more aesthetic factors of a transformed image, and training a content learning network based on a predefined set of sample images to extract one or more content factors from the received at least one image, an aesthetics learning network based on the predefined set of sample images to extract aesthetic factors from the received at least one image and a translation network based on the extracted content factors and aesthetic factors of the predefined set of sample images. At least one region of interest (RoI) is identified from the received at least one image based on the received one or more preferences of the user and one or more content factors and one or more aesthetic factors are extracted from the at least one identified RoI using the trained content learning network and aesthetics learning network. Further, the method derives at least one context from the extracted one or more content factors and one or more aesthetic factors using the trained translation network. Furthermore, the method comprising identifying context-aware workflow from the derived at least one context and the received one or more user preferences and calculating a similarity metric for the extracted at least one content and aesthetic factor to determine at least one context requirement. One or more context-adaptive image transformations are performed based on the identified context-aware workflow to get a transformed image, wherein the transformed image preserving the one or more content factors and aesthetics required for the context.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Referring now to the drawings, and more particularly to FIG. 1 through 8, where similar reference characters denote corresponding features consistently throughout the figures, there are shown preferred embodiments and these embodiments are described in the context of the following exemplary system and/or method.

Figure 1:
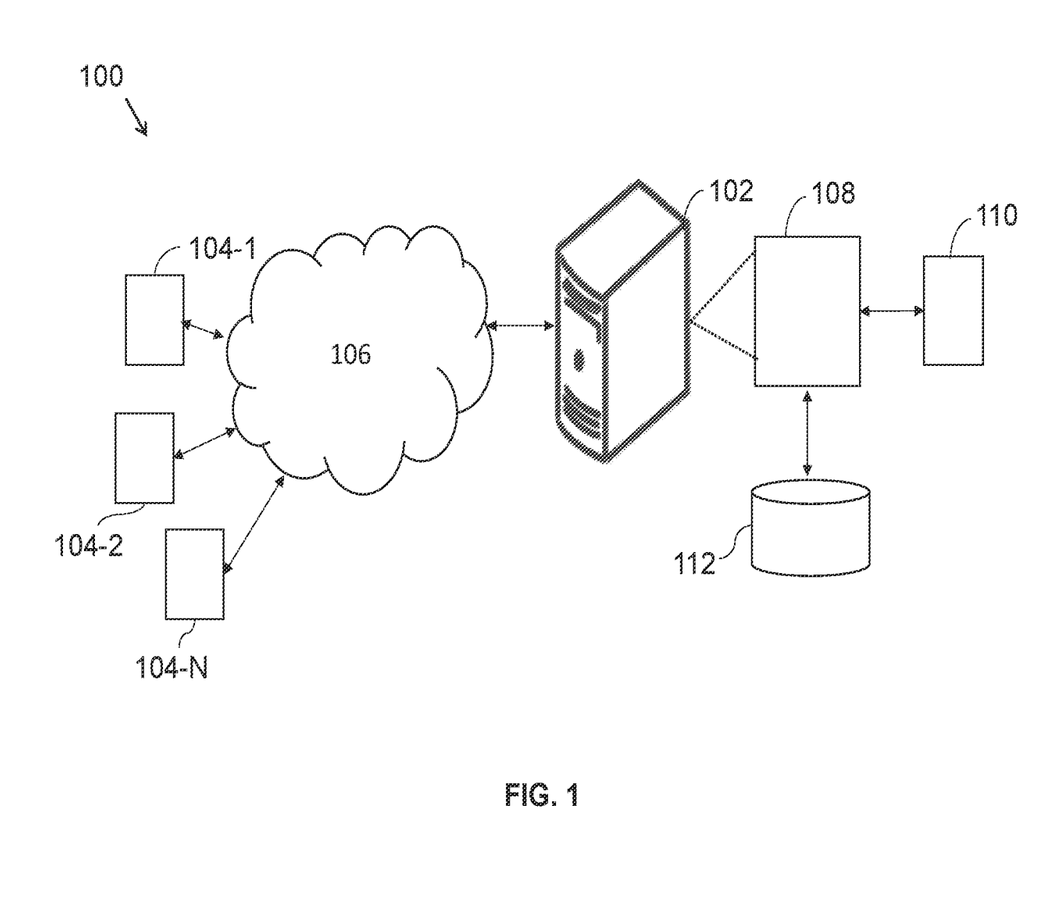
FIG. 1 illustrates an exemplary system for adaptive image transformation with respect to a given context, according to an embodiment of the present disclosure.

FIG. 1 illustrates a block diagram of a system (100) for one or more adaptive image transformations with respect to a given context, in accordance with an example embodiment. Although the present disclosure is explained considering that the system (100) is implemented on a server, it may be understood that the system (100) may comprises one or more computing devices, such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. The components and functionalities of the system (100) are described further in detail.

In the preferred embodiment, the system (100) is configured for one or more adaptive image transformations with respect to a given context and maintaining aesthetic sense of the transformed image. The system automatically learns the content and aesthetics required for a business context from already available domain samples and perform one or more required transformations on the input image to produce one or more output images, maintaining, preserving and composing the content and aesthetics demands in each of the output images. Herein, the system is configured to convert user defined transformation and context requirements into context-metadata to perform context image transformation with hybrid machine learning (ML) models using the context-metadata. Further, the system is configured to create context-aware automated transformation workflow using hybrid models based on the requirements.

The system (100) comprises at one or more databases (112) and one or more hardware processors (108) which are communicatively coupled with the at least one memory (102) to execute a plurality of modules (110) therein. Herein, the input/output interface (104) is configured to receive at least one image to perform one or more context-adaptive image transformations, and one or more preference of a user to specify one or more content factors and one or more aesthetic factors of a transformed image. It is to be noted that the adaptive image transformation refers to learning the context required for the business and performing one or more image transformations to obtain the results aligned to the context automatically.

It would be appreciated that the user can choose one of the contexts already learnt by the system to create a transformation workflow. Further, the user can also create a new context, if not already available, by providing samples for the context/domain. This context specifies the content and aesthetic demands to be considered while performing image transformations. Herein, the content factors represent one or more objects of importance for the business context in low dimensional embedding space for example representations of cars, dogs, and children etc. Further, the aesthetic factors represent photography style and design composition of image demanded by the business context in low dimensional embedding space. For example, photographic styles such as portrait/close-up/candid, location of text in images, light exposure of objects, presence, and location of salient objects in images etc.

Figure 2:
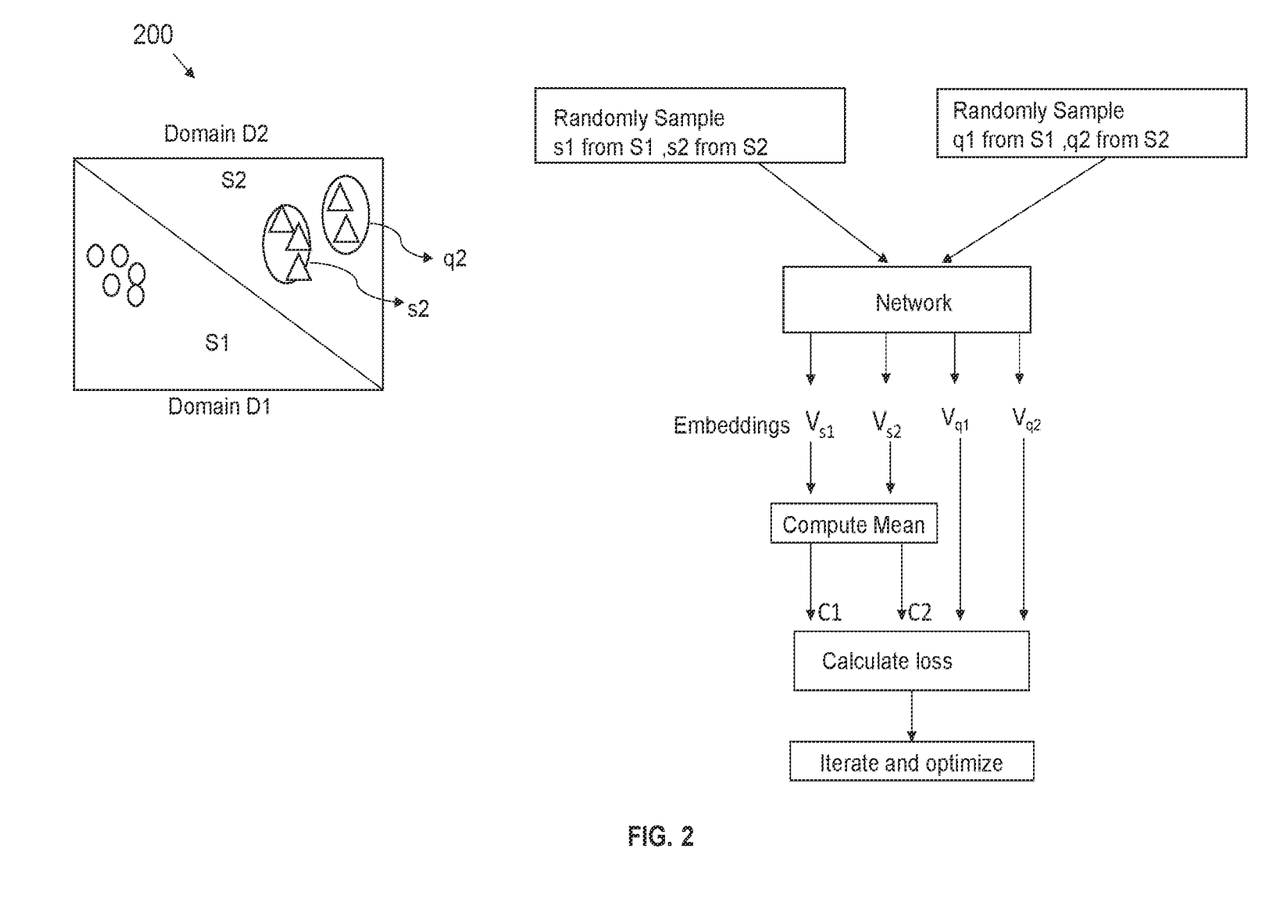
FIG. 2 is a functional block diagram to illustrate training process involving two different contexts, according to an embodiment of the present disclosure.

Referring FIG. 2, a functional flow diagram (200) to illustrate network training, wherein the system (100) is configured to train a content learning network based on a predefined set of sample images to extract one or more content factors from the received at least one image. Further, the system (100) is configured to train an aesthetics learning network based on the predefined set of sample images to extract aesthetic factors from the received at least one image, and a translation network based on the extracted content factors and aesthetic factors of the predefined set of sample images to derive context factors.

The content learning network is a deep neural network based on ConvNet architecture. The content learning network includes a series of convolutional layers, each accompanied with normalization and pooling layers, and are followed by one or more linear transformation layers to produce a final low dimensional vector. The content learning network layer takes one or more images as input and produces a corresponding n-dimensional vector representation.

Figure 3:
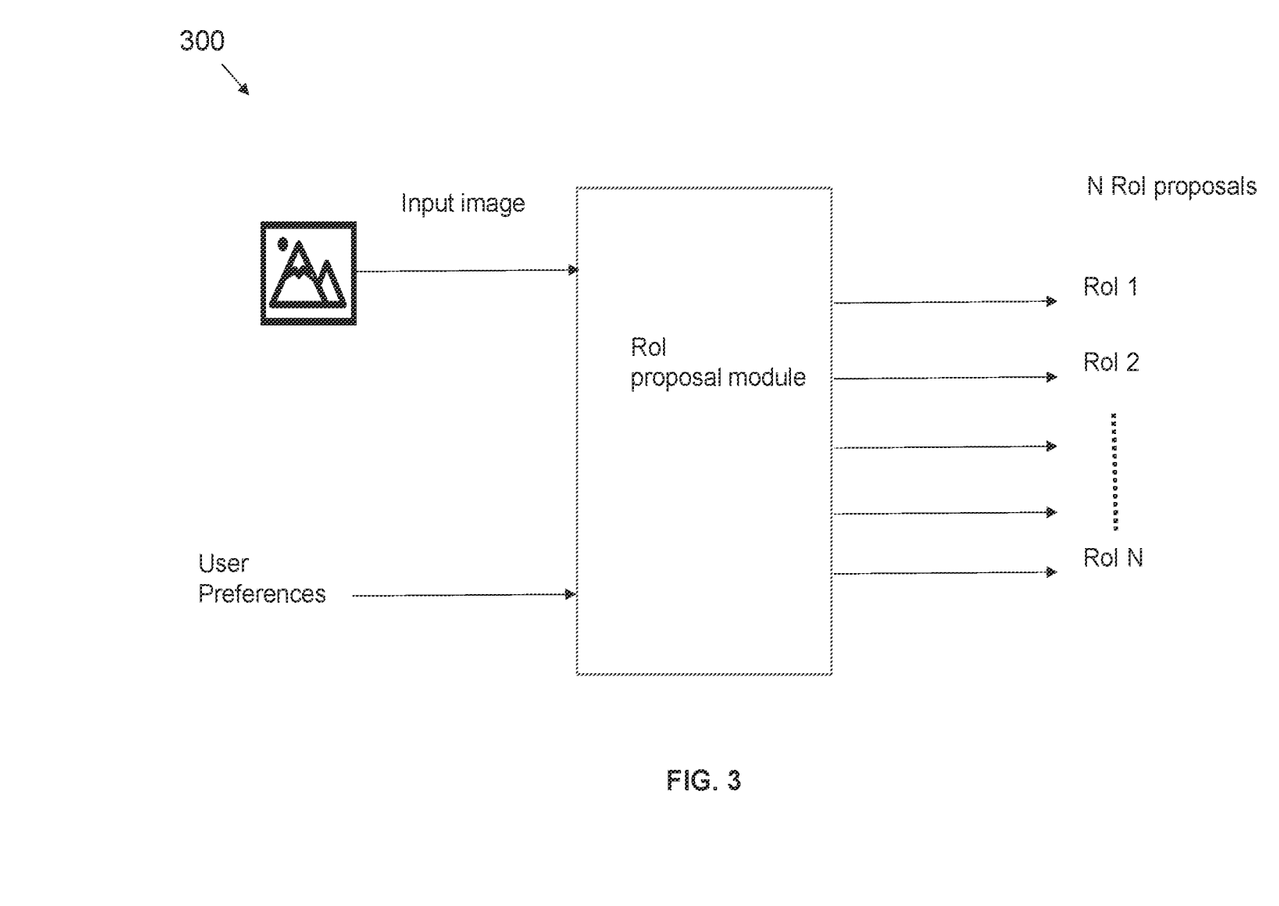
FIG. 3 is a schematic diagram to illustrate region of interest (RoI) extraction, according to an embodiment of the present disclosure.

Referring FIG. 3, a schematic diagram (300), wherein the system (100) is configured to identify at least one region of interest (RoI) from the received at least one image based on the received one or more preferences of the user. Herein, a RoI proposal module of the system (100) takes in the input image, one or more user preferences such as RoI method, max-RoI size etc. and extracts RoI's based on the preferences chosen. The RoI proposal module uses either selective search or sliding window to extract RoIs.

Figure 4A:
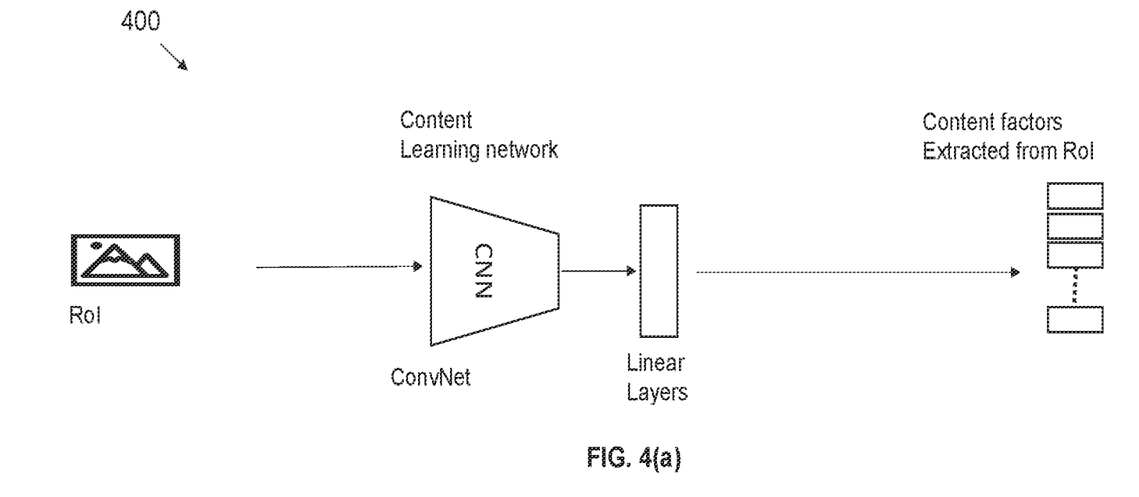
FIGS. 4(a) & 4(b) is a functional block diagram to extract content factors and aesthetic factors from the RoI, according to an embodiment of the present disclosure.
Figure 4B:
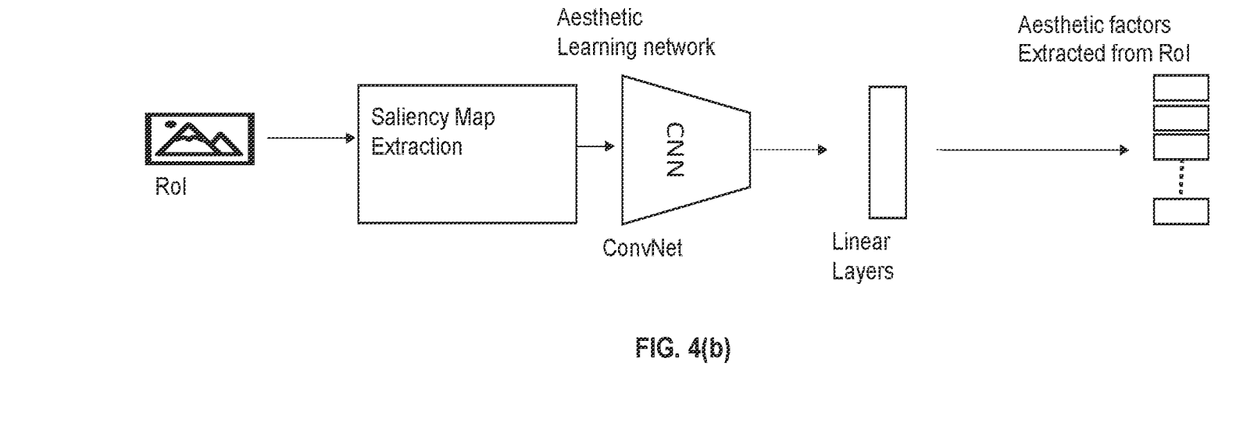

Referring FIGS. 4(a) & 4(b), a schematic diagram (400), wherein the system (100) is configured to extract one or more content factors and one or more aesthetic factors from the at least one identified RoI using the trained content learning network and aesthetics learning network. Herein, the input image is passed to the content learning network already pretrained on domain samples, to extract the content factors (embedding) from the image. Similarly, a saliency map is extracted from the input image using image processing techniques and the map is passed to an aesthetic learning network already pretrained on saliency maps of domain samples, to extract the aesthetics factors.

To extract the content factors important for the given domain or business context, the content learning network is trained with one or more sample images. The training is optimized in such a way that the Euclidian distance between representation of any pair of samples of the domain/context is minimum. The training is performed till the representations of sample images are clustered closely in the embedding space. After the training, the mean value of all the representations in the cluster is taken/identified as content factors for the context or domain.

Further, the aesthetics learning network is trained based on the predefined set of sample images to extract aesthetic factors from the received at least one image. The aesthetics learning network is a deep neural network based on ConvNet architecture. It includes a series of convolutional layers, each accompanied with normalization and pooling layers, and are followed by one or more linear transformation layers to produce a final low dimensional vector. The aesthetics learning network layer takes one or more images as input and produces a corresponding n-dimensional vector representation. To extract the aesthetic factors important for the given domain or business context, the aesthetics learning network is trained with saliency maps of one or more sample images. The training is optimized in such a way that the Euclidian distance between representation of any pair of samples of the domain/context is minimum. The training/optimization is performed till the representations of samples are clustered closely in the embedding space. After the optimization, the mean value of all the representations in the cluster is taken/identified as aesthetic factors for the context or domain.

Moreover, the translation network is trained with extracted content and aesthetic factors of the predefined set of sample images. The translation network is a multilayer perceptron network (MLP) that includes multiple densely connected linear layers to produce a n-dimensional vector representation. To extract the context factors important for the given domain or business context, the translation network is trained with content factors and aesthetic factors of all domain samples already extracted and clustered in separate embedding spaces. The training is optimized in such a way that the Euclidian distance between output representation of any pair of samples of the domain/context is minimum (while maximizing the distance from other clusters of different contexts) The training/optimization is performed till the representations of samples are clustered closely in the embedding space. After the optimization, the mean value of all the representations in the cluster is taken/identified as 'context factors' for the context or domain.

Figure 5:
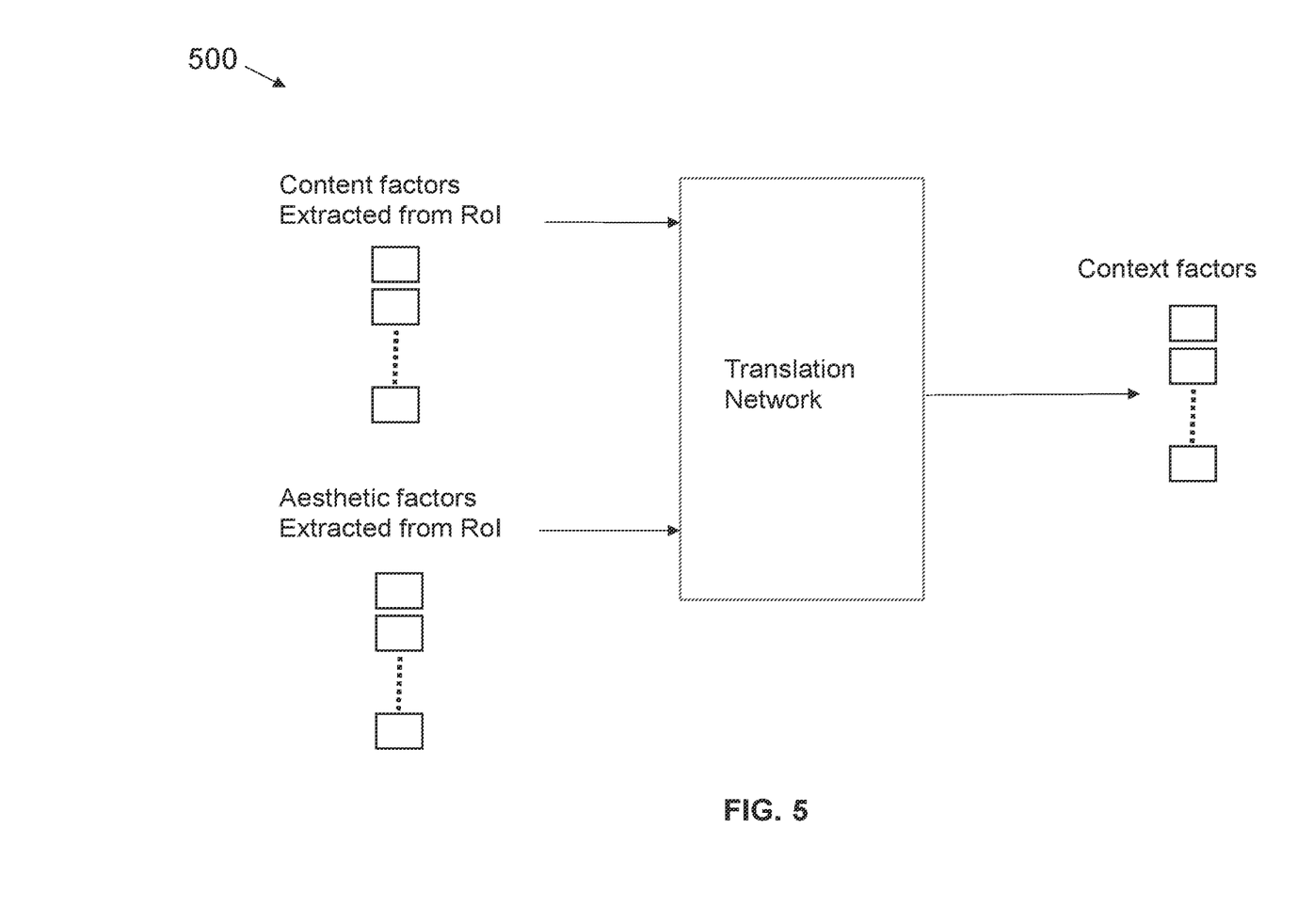
FIG. 5 is a functional block diagram to derive context from the extracted content and aesthetic factors, according to an embodiment of the present disclosure.

Referring FIG. 5, a functional block diagram (500), wherein the system (100) is configured to drive at least one context from the extracted one or more content factors and one or more aesthetic factors using a pre-trained translation network. Herein, the extracted content factors and the aesthetic factors representations of input image is passed to the translation network already pretrained on content and aesthetic factors of domain samples, to extract the context factors/representation. Further, the system (100) is configured to identify context aware workflow from the derived at least one context and the received one or more user preferences. Herein, the context aware workflow defines a sequence of context aware transformation tasks, created/identified based on the user preferences.

Furthermore, the system (100) is configured to calculate a similarity metric for the extracted at least one content and aesthetic factor from the at least one RoI. It would be appreciated that the system (100) calculates a similarity metric to validate the similarity between the at least one RoI and domain sample images in terms of both content and aesthetics. The RoIs, that are very similar to domain sample images, are revealed by the similarity metric which are chosen for other downstream transformation tasks. Herein, the process of calculating similarity metric includes:
  a) For each RoI, the content, aesthetic and context factors are extracted using the content learning network, aesthetic learning network and context learning network, respectively.
  b) The proximity of these content, aesthetic, and context factors from the centroid of content, aesthetic, and context clusters (in separate embedding spaces) of sample domain images is measured using a Squared Euclidean distance, called as proximity score.
  c) The proximity score calculated for content, aesthetic, and context factors of each RoI are weighed with importance score defined by user, that ranges between 0 and 1. Herein, the importance score indicates what weightage (between 0 and 1) to be given to content, aesthetic, and context. Default importance score being 0.1, 0.1, 0.8 for content, aesthetics, and context proximity scores. d) one or more RoI's, as defined in user preferences, having good similarity score (i.e minimum proximity) will be chosen as candidates for further downstream transformation tasks.

In one aspect, the system (100) is configured to perform one or more context-adaptive image transformations based on the identified context-aware workflow to get a transformed image. The transformed image preserving the content and aesthetics required for the context.

In another aspect, the system (100) is configured to append a text to the identified at least one RoI based on the extracted saliency map, the calculated similarity metric for the at least one content, the aesthetic factor, and the received one or more preference of the user.

Figure 6:
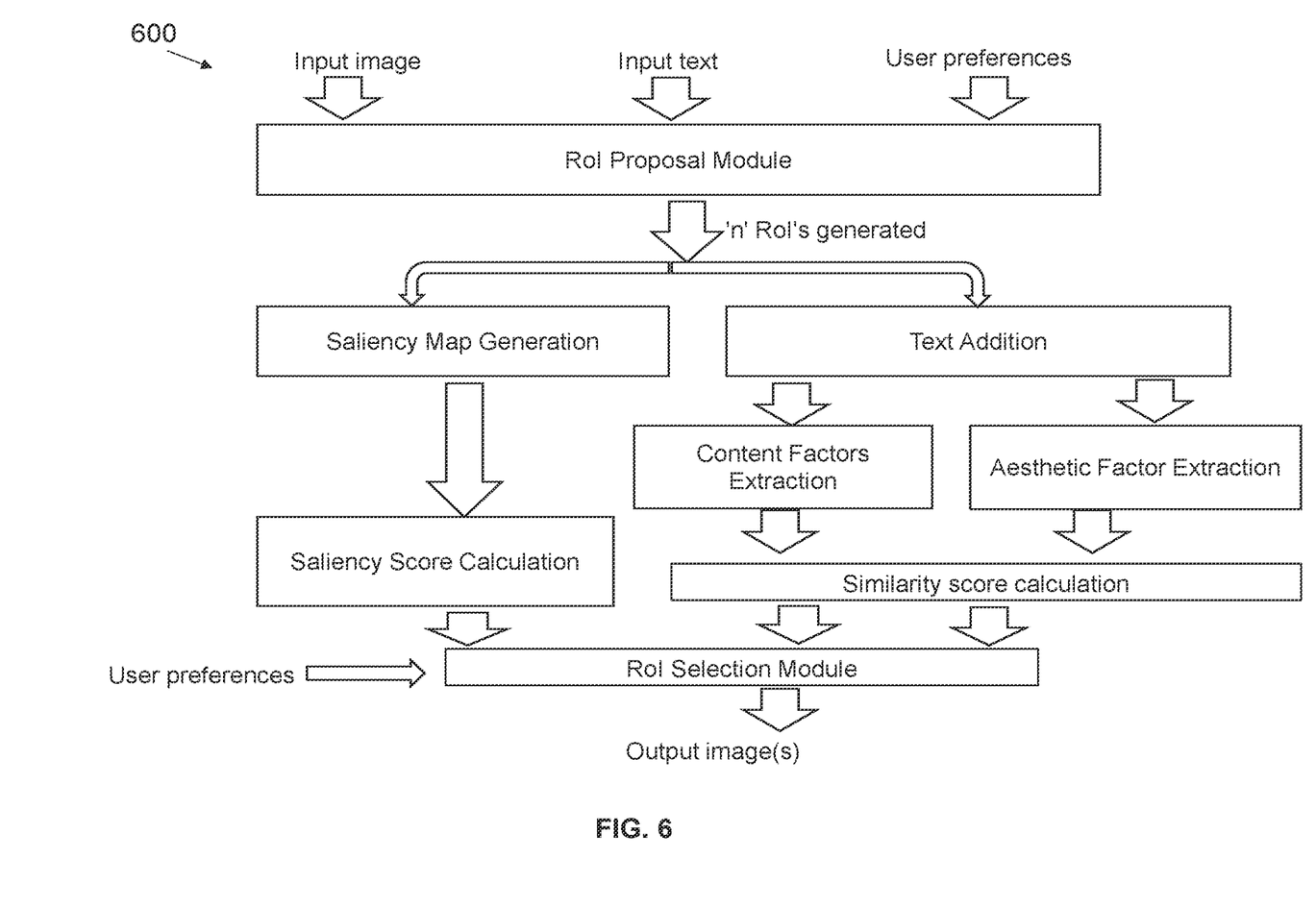
FIG. 6 is an example to illustrate adaptive image transformation with respect to a given context and maintaining aesthetic sense of the transformed image, according to an embodiment of the present disclosure.

Referring FIG. 6, an example, wherein the RoI proposal module takes in the input image, input text and one or more user preferences such as strides, padding, boundary, output Choices (k) etc. The RoI proposal module creates a sliding window based on input text size and user preferences and proposes 'n' RoI's (bounding box coordinates) of approximately equal size, by moving the sliding window over the input image. The portions of input image defined by RoI coordinates are extracted and saliency maps are generated. For each saliency map, a saliency score is calculated as mean of all pixel values in saliency map. Also, the input text is added to the input image in each of the 'n' RoI's (one at a time) producing 'n' intermediate output images. The intermediate output images are passed through pretrained content and aesthetics networks to extract content and aesthetic factors, for which similarity score is calculated with already available domain samples. Based on the saliency score and the similarity score of content and aesthetic factors of RoI, the RoI selection module selects 'k' intermediate output images as final output images, where 'k' is specified as a user preference (output choices).

Further, the system (100) is configured to convert the determined at least one context requirement and the received one or more user preferences into a context-metadata to perform one or more context-adaptive image transformations using the context-metadata with the pre-trained hybrid ML model.

Figure 7:
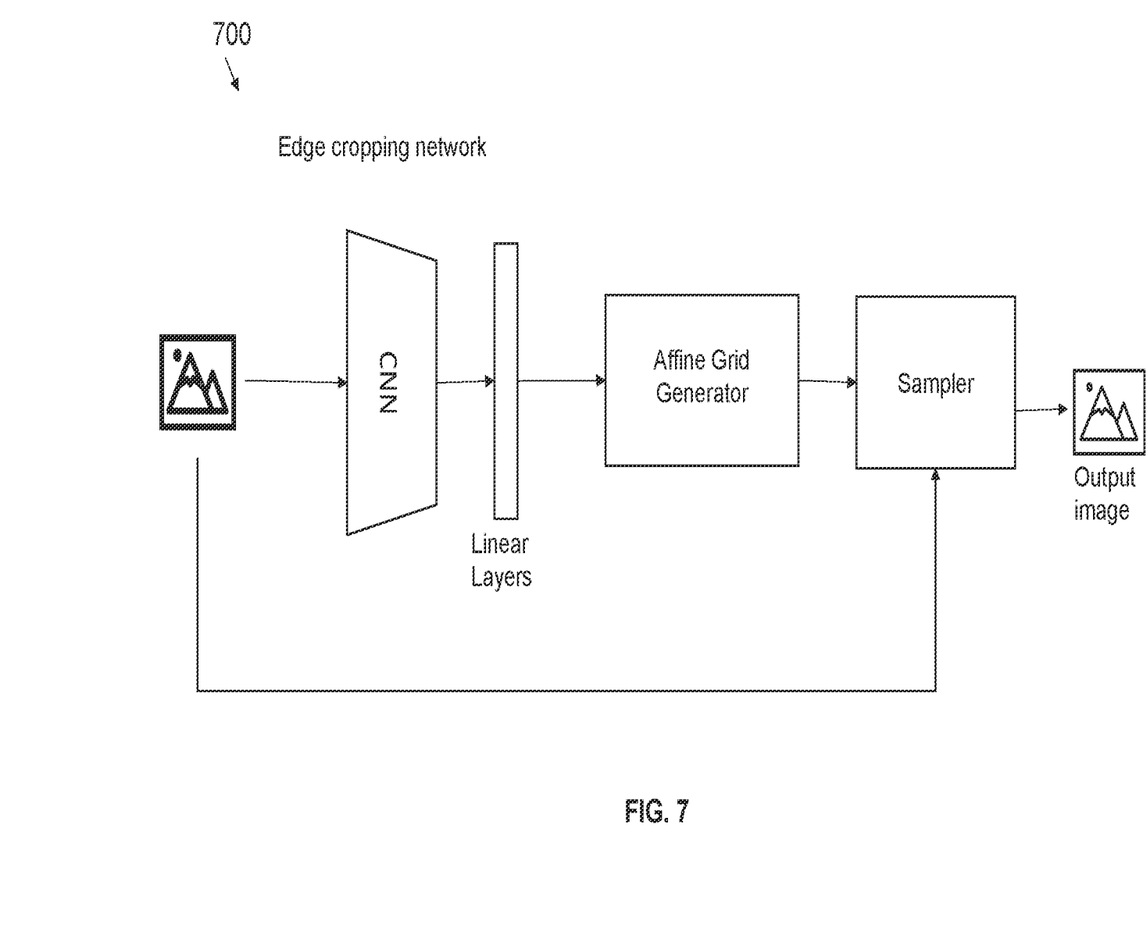
FIG. 7 is a functional block diagram to illustrate aesthetic edge correction, according to an embodiment of the present disclosure.

Referring FIG. 7, illustrating a functional block diagram (700), wherein the system (100) is configured to perform an aesthetic edge correction on final output image using an edge cropping network that crops-off unwanted parts in the left, right, top and bottom edges. If the edges are aesthetically within the predefined range, no cropping will be performed. For e.g. unwanted borders, captions, or parts of subjects in the edges will be cropped off by aesthetic edge correction. Herein, the edge cropping network is a Spatial Transformer Network (STN) based deep neural network that produces an output image by removing unwanted portions in the edges of input image. A localization network is a regular CNN which calculates the transformation (cropping) parameters from the input image and a grid generator generates a grid of coordinates in the input image corresponding to each pixel from the output image and a sampler crops the input image based on the grid coordinates calculated.

Figure 8:
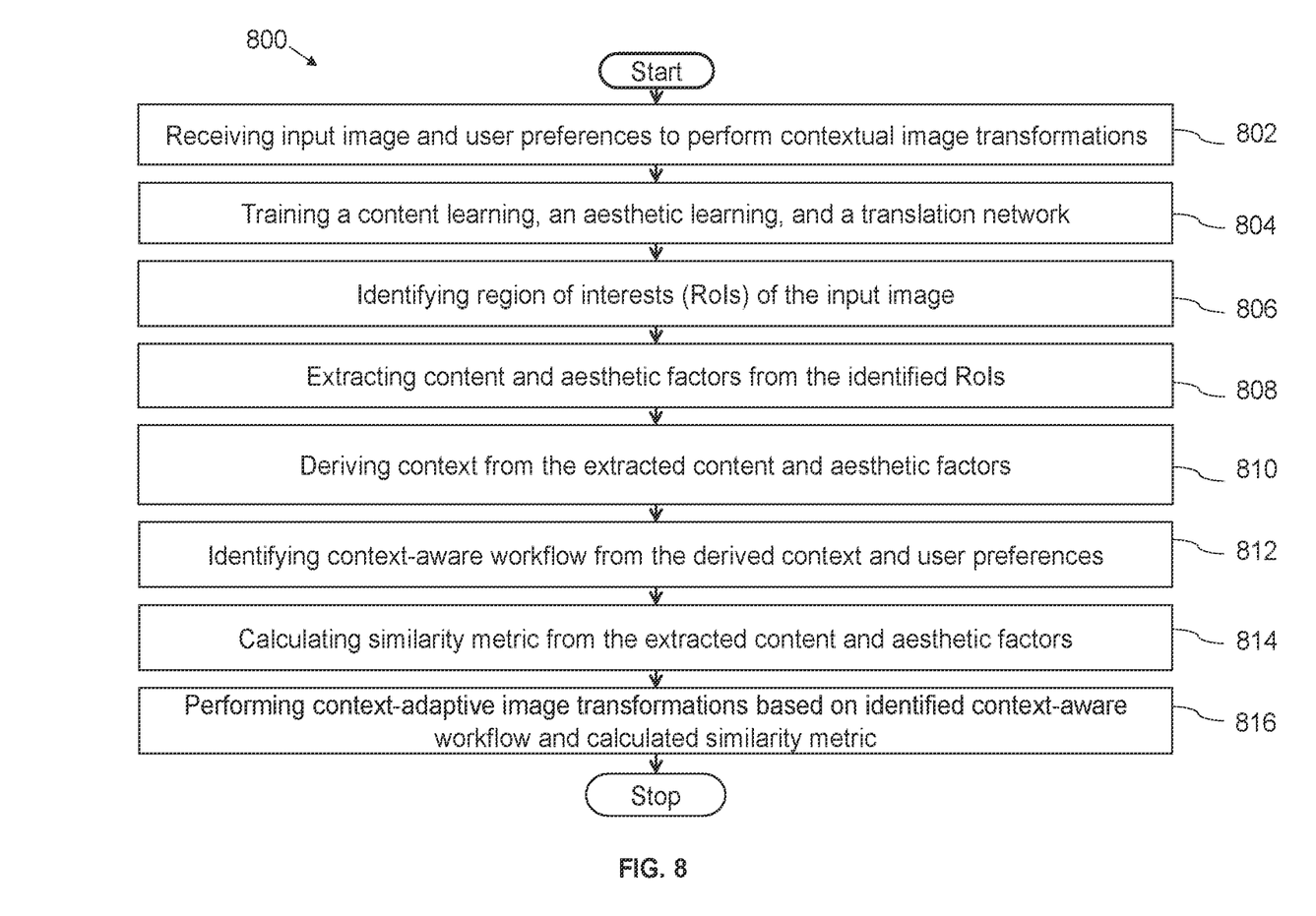
FIG. 8 is a flow diagram to illustrate a method for adaptive image transformation with respect to a given context, in accordance with an embodiment of the present disclosure.

Referring FIG. 8, to illustrate a processor-implemented method (800) for adaptive image transformation with respect to a given context and maintaining aesthetic sense of the transformed image is provided.

Initially, at the step (802), at least one image is received via an input/output interface to perform one or more context-adaptive image transformations, and one or more preference of a user is received to specify one or more content factors and one or more aesthetic factors of a transformed image.

In the preferred embodiment, at the next step (804), a content learning network, an aesthetics learning network and a translation network are trained. It is to be noted that the content learning network and aesthetic learning network are trained based on a predefined set of sample images to extract one or more content factors and aesthetic factor from the received at least one image. Whereas the translation network is trained with content and aesthetic factors extracted from predefined set of domain samples.

In the preferred embodiment, at the next step (806), at least one region of interest (RoI) is identified from the received at least one image based on the received one or more preferences of the user.

In the preferred embodiment, at the next step (808), extracting one or more content factors and one or more aesthetic factors from the at least one identified RoI using the trained content learning network and aesthetics learning network.

In the preferred embodiment, at the next step (810), deriving at least one context from the extracted one or more content factors and one or more aesthetic factors using a pre-trained translation network.

In the preferred embodiment, at the next step (812), a context-aware workflow is identified from the derived at least one context and the received one or more user preferences.

In the preferred embodiment, at the next step (814), calculating a similarity metric for the extracted at least one content and aesthetic factor to determine at least one context requirement.

In the preferred embodiment, at the next step (816), performing one or more context-adaptive image transformations based on the identified context-aware workflow and calculated similarity metric to get a transformed image, wherein the transformed image preserving the content and aesthetics required for the context.

In another aspect, wherein a saliency map is extracted for the identified at least one RoI to append a text to the identified at least one RoI based on the extracted saliency map, the calculated similarity metric for the at least one content and aesthetic factor and the received one or more preference of the user.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of transforming images in a quick and consistent way. In the existing state of the art, there are various challenges in image transformation task such as maintaining both content and aesthetic sense in performing transformations, frequently changing contextual requirements, extending solution to new contexts/domains for new clients/markets, high volume of images to be processed, consistent output across a context/domain and a quicker time-to-market. The proposed system automatically learns the content and aesthetics required for a business context from already available domain samples and perform one or more required transformations on the input image to produce one or more output images, maintaining, preserving and composing the content and aesthetics demands in each of the output images.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

What is claimed is:

1. A processor-implemented method of one or more context-adaptive image transformations comprising:
receiving, via an input/output interface, at least one image to perform one or more context-adaptive image transformations, and one or more preferences of a user to specify one or more content factors and one or more aesthetic factors of a transformed image;
training, via one or more hardware processors, a content learning network based on a predefined set of sample images to extract at least one content factor from the received at least one image;
training, via the one or more hardware processors, an aesthetics learning network based on the predefined set of sample images to extract aesthetic factors from the received at least one image;

training, via the one or more hardware processors, a translation network based on the extracted content factors and aesthetic factors of the predefined set of sample images;

identifying, via the one or more hardware processors, at least one region of interest (RoI) from the received at least one image based on the received one or more preferences of the user;

extracting, via the one or more hardware processors, one or more content factors and one or more aesthetic factors from the at least one identified RoI using the trained content learning network and aesthetics learning network;

deriving, via the one or more hardware processors, at least one context from the extracted one or more content factors and one or more aesthetic factors using the trained translation network;

identifying, via the one or more hardware processors, context-aware workflow from the derived at least one context and the received one or more user preferences;

calculating, via the one or more hardware processors, a similarity metric for the extracted at least one content and aesthetic factor to determine at least one context requirement; and performing, via the one or more hardware processors, one or more context-adaptive image transformations based on the identified context-aware workflow and calculated similarity metric to get a transformed image, wherein the transformed image preserving the one or more content factors and aesthetics required for the context.

2. The processor-implemented method of claim 1, further comprising:

extracting, via the one or more hardware processors, a saliency map for the identified at least one RoI; and appending, via the one or more hardware processors, a text to the identified at least one RoI based on the extracted saliency map, the calculated similarity metric for the at least one content and aesthetic factor and the received one or more preference of the user, wherein the text is received from the user.

3. The processor-implemented method of claim 1, wherein one or more context-adaptive image transformations includes cropping, ratio-based aspect resolution, aesthetic edge correction and text addition.

4. The processor-implemented method of claim 1, wherein the extracted one or more content factors and the one or more aesthetic factors are clustered in a separate embedding space.

5. The processor-implemented method of claim 1, wherein the predefined set of sample images and its corresponding spectral saliency map are used to train the context learning network and aesthetic learning network to extract and cluster the at least one content and aesthetic factor in separate embedding spaces.

6. A system for one or more context-adaptive image transformations comprising:

an input/output interface for:
 receiving at least one image to perform one or more image transformations; and
 receiving one or more preference of a user and at least one context to specify object of interest (OoI) of the at least one image;

one or more hardware processors;

at least one repository of one or more neural networks, a plurality of user-defined context specification, and a plurality of sample images used for training of the one or more neural networks;

at least one memory in communication with the one or more hardware processors, wherein the one or more hardware processors are configured to execute programmed instructions stored in the memory, to:
 train a content learning network based on a predefined set of sample images to extract one or more content factors from the received at least one image;
 train an aesthetics learning network based on the predefined set of sample images to extract aesthetic factors from the received at least one image;
 train a translation network based on the extracted content factors and aesthetic factors of the predefined set of sample images;
 identify at least one region of interest (RoI) from the received at least one image based on the received one or more preferences of the user;
 extract one or more content factors and one or more aesthetic factors from the at least one identified RoI using the trained content learning network and aesthetics learning network;
 derive at least one context from the extracted one or more content factors and one or more aesthetic factors using a pre-trained translation network;
 identify context-aware workflow from the derived at least one context and the received one or more user preferences;
 calculate a similarity metric for the extracted at least one content and aesthetic factor to determine at least one context requirement; and
 perform one or more context-adaptive image transformations based on the identified context-aware workflow and calculated similarity metric to get a transformed image, wherein the transformed image preserving the one or more content factors and aesthetics required for the context.

7. The system of claim 6, further comprising:

extracting a saliency map for the identified at least one RoI; and appending a text to the identified at least one RoI based on the extracted saliency map, the calculated similarity metric for the at least one content and aesthetic factor and the received one or more preference of the user.

8. The system of claim 6, wherein the translation network is trained to derive the at least one context factor and cluster the derived at least one context factor together in an embedding space.

9. A non-transitory computer readable medium storing one or more instructions which when executed by one or more processors on a system cause the one or more processors to perform the method comprising:

receiving, via an input/output interface, at least one image to perform one or more context-adaptive image transformations, and one or more preference of a user to specify one or more content factors and one or more aesthetic factors of a transformed image;

training, via one or more hardware processors, a content learning network based on a predefined set of sample images to extract one or more content factors from the received at least one image;

training, via the one or more hardware processors, an aesthetics learning network based on the predefined set of sample images to extract aesthetic factors from the received at least one image;

training, via the one or more hardware processors, a translation network based on the extracted content factors and aesthetic factors of the predefined set of sample images;

identifying, via the one or more hardware processors, at least one region of interest (RoI) from the received at least one image based on the received one or more preferences of the user;

extracting, via the one or more hardware processors, one or more content factors and one or more aesthetic factors from the at least one identified RoI using the trained content learning network and aesthetics learning network;

deriving, via the one or more hardware processors, at least one context from the extracted one or more content factors and one or more aesthetic factors using the trained translation network;

identifying, via the one or more hardware processors, context-aware workflow from the derived at least one context and the received one or more user preferences;

calculating, via the one or more hardware processors, a similarity metric for the extracted at least one content and aesthetic factor to determine at least one context requirement; and performing, via the one or more hardware processors, one or more context-adaptive image transformations based on the identified context-aware workflow and calculated similarity metric to get a transformed image, wherein the transformed image preserving the one or more content factors and aesthetics required for the context.

10. The non-transitory computer readable medium of claim 9, further comprising:

extracting, via the one or more hardware processors, a saliency map for the identified at least one RoI; and appending, via the one or more hardware processors, a text to the identified at least one RoI based on the extracted saliency map, the calculated similarity metric for the at least one content and aesthetic factor and the received one or more preference of the user.

\* \* \* \* \*